Feb. 24, 1931. R. O. HENDRICKSON 1,793,482
TRACTOR
Filed July 26, 1927 2 Sheets-Sheet 1
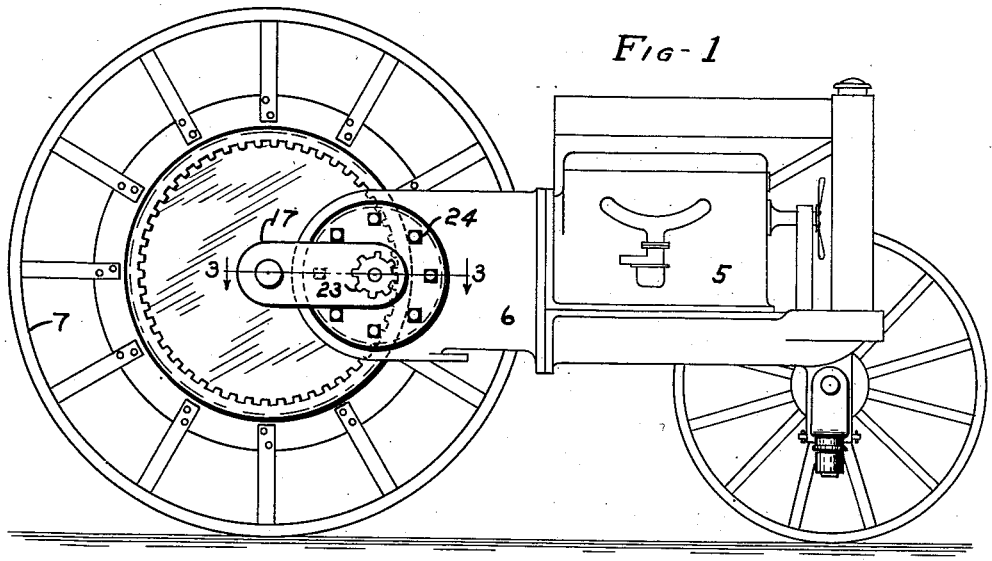
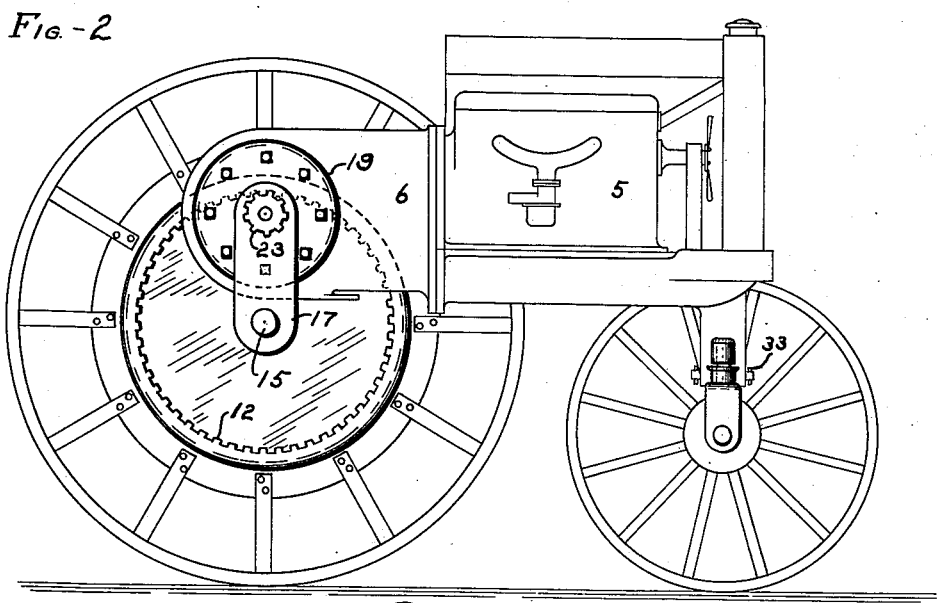
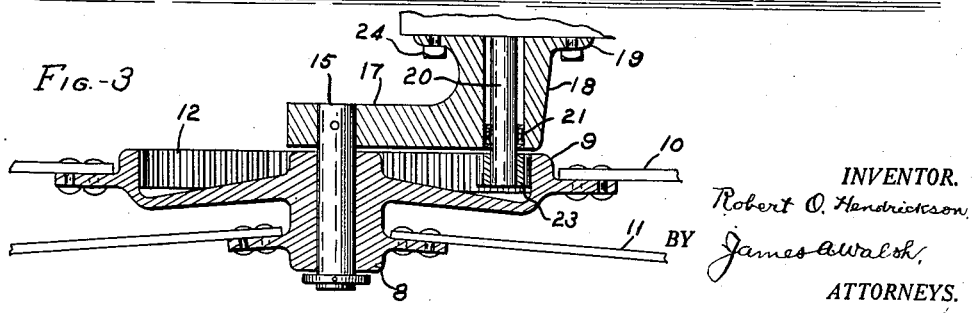
INVENTOR.
Robert O. Hendrickson
BY James A. Walsh
ATTORNEYS.

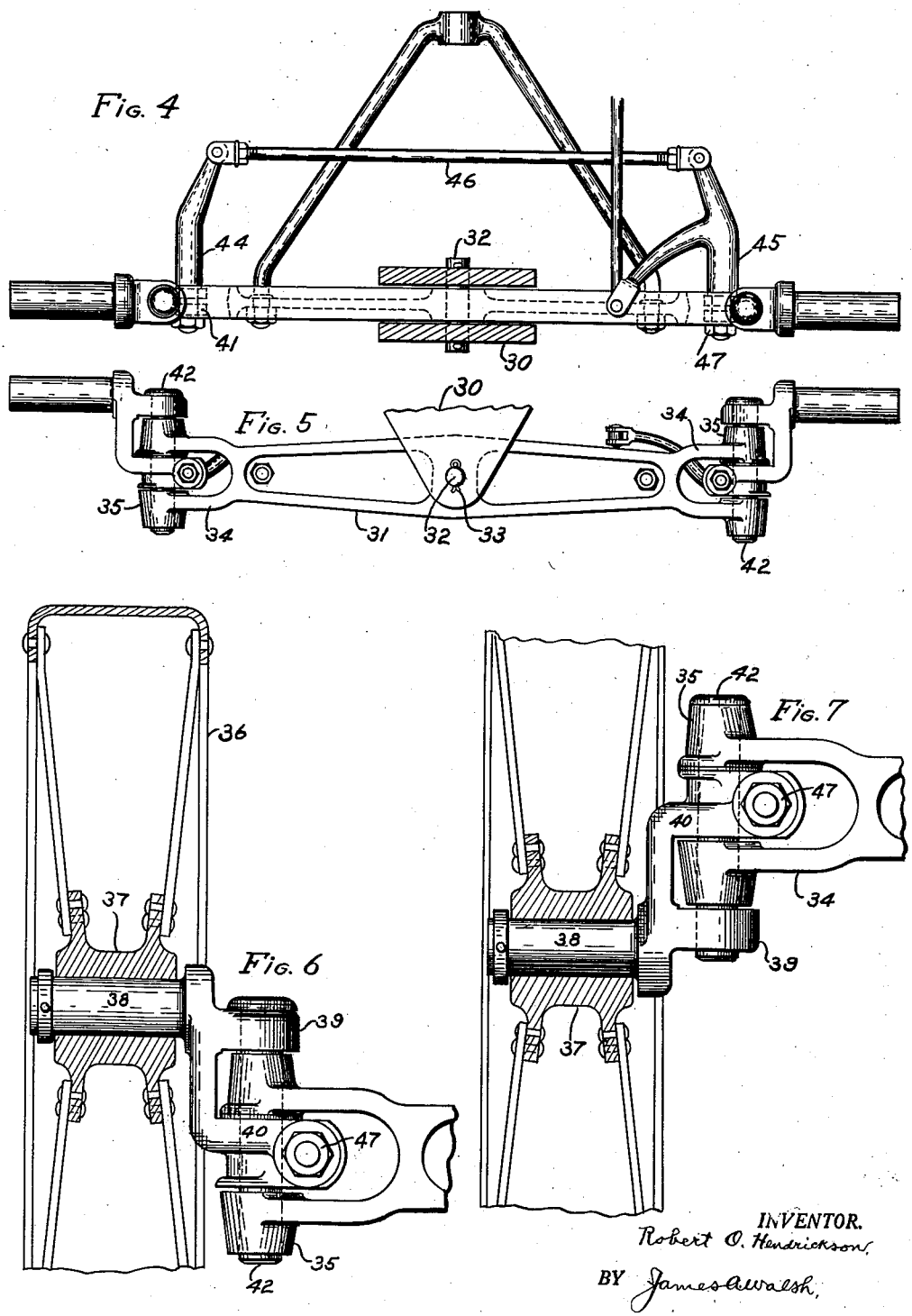

Patented Feb. 24, 1931

1,793,482

UNITED STATES PATENT OFFICE

ROBERT O. HENDRICKSON, OF RACINE, WISCONSIN, ASSIGNOR TO J. I. CASE COMPANY, OF RACINE, WISCONSIN, A CORPORATION

TRACTOR

Application filed July 26, 1927. Serial No. 208,513.

In the employment of tractors for agricultural and other purposes it is of material advantage in certain work to maintain the body of the tractor in low-down position in relation to the ground, particularly when plowing and operating in orchards, while in other circumstances, as when cultivating corn row crops, it is essential that the tractor body be positioned at sufficient height to avoid destructive contact with hills or rows of the soil or the growing crop; and it is therefore my object to provide a tractor for general purposes, the body of which lies normally close to the ground as is common, and which may also be readily raised from such lowdown position to a height suitable for use with cultivators and other duties, so that by my improvement I am enabled to utilize a single tractor capable of being so adjusted as to perform work of general character and also such agricultural and other duties as may otherwise require a tractor especially for the latter purposes, and which I accomplish in a simple manner without the addition or subtraction of parts in any manner.

In the accompanying drawing, forming part hereof, Figure 1 is a side elevation of a tractor embodying my improvements the body thereof being shown as adjusted to its lowermost position; Fig. 2, a similar view with the body elevated; Fig. 3, a detail section taken on the dotted line 3—3 in Fig. 1; Fig. 4 a plan of the front axle and associated parts; Fig. 5, a front elevation of said axle and parts; and Figs. 6 and 7, fragments of a front wheel showing the low and high positions of the front axle, respectively.

Referring to said drawings, the tractor body includes the engine casing, 5, transmission housing, 6, and other attachments common to tractors. For purposes of clearness I have shown Figs. 1 and 2 with the near rear and forward wheels removed, but in Fig. 3 the near rear wheel is indicated in fragment to show the relation of both rear wheels to the raising and lowering mechanism to be described. Each of the rear wheels, 7, comprises a hub, 8, embodying or to which may be secured a flanged disk, 9, to which and the outer end of the hub 8 spokes, 10, 11, are connected and at their outer ends are secured to the rim of the wheel, the disk 9 containing or embodying an internal gear ring, 12. It will be understood of course, that other forms of gear rings or wheels may be employed, or the equivalent thereof, but I have chosen to illustrate the structure specifically described as being entirely satisfactory in practice, and that said ring may be completely enclosed. Each of the wheels 7 is mounted upon an axle, 15, which is supported in a bracket including an arm, 17, and shoulder, 18, the latter terminating in a flange or anchor-plate, 19, and forming a bearing for a transmission shaft, 20, connected to transmission mechanism (not shown) in the housing 6 in any well known or desired manner, and projecting through the latter, as indicated in Fig. 3, and between which bearing and shaft anti-friction bearings, 21, are provided for a well known purpose.

Upon the outer end of shaft 20 I provide a pinion, 23, which meshes with gear ring 12 and rotates wheel 7. The anchor-plate 19 is connected to housing 6 by a series of bolts, 24, and when it is desired to change the height of the tractor body these bolts are removed, so that by turning the arm 17 upwardly by any suitable means the housing 6 is accordingly raised to the desired height within the range of movement of the arm, the extreme upward movement or position of the housing being indicated in Fig. 2. When the desired elevation is attained it is but necessary to replace the bolts, when the wheel is in condition to be rotated by the rotary action of transmission shaft 20 and its pinion 23. While the change of position of the rear axle bracket from that shown in Fig. 1 to its vertical position shown in Fig. 2 indicates a quarter turn it will be readily apparent that a complete revolution of the bracket may be made, or any part thereof, and that the housing 6 will be immovably secured in such predetermined position by bolting the plate 19 thereto; and that when it is desired to lower the body the movement of the bracket is reversed upon removal of the bolts 24, in like manner as before. As the equipment of each rear wheel and its mounting on a rear axle bracket is the same, and each wheel being driven by a shaft actuated by transmission mechanism, it will be understood that each bracket may be raised and lowered independently of the other bracket, and that the anchor-plate 19 serves as a gage to locate the brackets uniformly at each side of housing 6 by means of bolts 24.

In order to have the tractor body in substantially level position it becomes necessary to also adjust the forward end thereof to correspond to the height to which the housing 6 has been raised or lowered, and this I accomplish as follows: To frame member, 30, I pivotally secure a front axle, 31, by means of a king-pin, 32, securing these parts by cotter-pins, 33, or otherwise. Said axle 31 at each end is provided with a yoke, 34, embodying bearings, 35. The front wheel, 36, embodies a hub, 37, in which is mounted a knuckle comprising a spindle, 38, and bosses, 39, 40, the latter being split, at 41, Fig. 4. The axle and front wheels are assembled by alining the yoke members 35 with the bosses 39, 40, and connecting these assembled parts with a pin, 42, as indicated at each end of Fig. 5. The usual steering arms, 44, 45, are connected by a link, 46, and secured to the knuckle bosses 40 by a nut, 47, which at the same time clamps the split ends of said bosses 40, indicated in Fig. 4, so that the same will have a binding effect upon the pin 42, and which nut also forms part of the steering arm. In Figs. 4, 5 and 6 the front axle and steering knuckles are shown so assembled as to maintain the front portion of the tractor body in its lowermost position, and as also indicated in Fig. 1; and when it is desired to raise or adjust the front body portion to correspond to the height of its rear portion the nuts 47 are removed, the steering arms 44, 45, withdrawn, and the pins 42 also removed, when the knuckle through its spindle can be readily turned from the position shown in Fig. 6 to that shown in Fig. 7, so that the knuckle bosses will be located above the axes of the wheels, and upon again connecting the axle 31 to the yoke bearings and bosses it will be seen that the front portion of the tractor will be accordingly raised and the body thereof brought to level position as indicated in Fig. 2. This front adjustment, as will be understood, is accomplished without disturbing the axle 31 in its relation to the tractor body, and the mere upward turning of the steering knuckles provides a corresponding elevation of the front axle when connected thereto.

In the manner described it will be apparent that the tractor body can be readily raised and lowered to the height desired, and that it is unnecessary in making such adjustments to either subtract or add parts of any character, which is both of advantage and importance, as equipment removed and carried or stored for special purposes in connection with a tractor, which is frequently subject to rough and careless usage, becomes misplaced or broken and the purpose therefor defeated; and it may be further explained that in the manufacture of a front axle, knuckle and steering mechanism, for my purpose, no additional machine work or parts are required than are present in knuckle-type axles of conventional design or as found in many automobile front axles.

I claim as my invention:

1. The combination, with a tractor, of a front axle; a bearing on the axle; a steering knuckle embodying a spindle, a perforate boss and a split boss, and adapted to be positioned in reverse directions on the axle for raising and lowering the tractor; a pin connecting the axle bearing and said bosses; a steering arm mounted in the split boss; and means for binding the split boss about said pin and for securing the steering arm to the split boss.

2. The combination, with a tractor, of a front axle; a steering knuckle connected to the axle embodying a spindle, a perforate boss and a split boss, and adapted to be positioned in reverse directions on the axle for raising and lowering the tractor; a steering arm permanently alined with and terminating in the split boss; and a nut connecting the steering arm and boss and also connecting the ends of the split boss, for the purposes stated.

In testimony whereof I affix my signature.

ROBERT O. HENDRICKSON.